Patented July 1, 1958

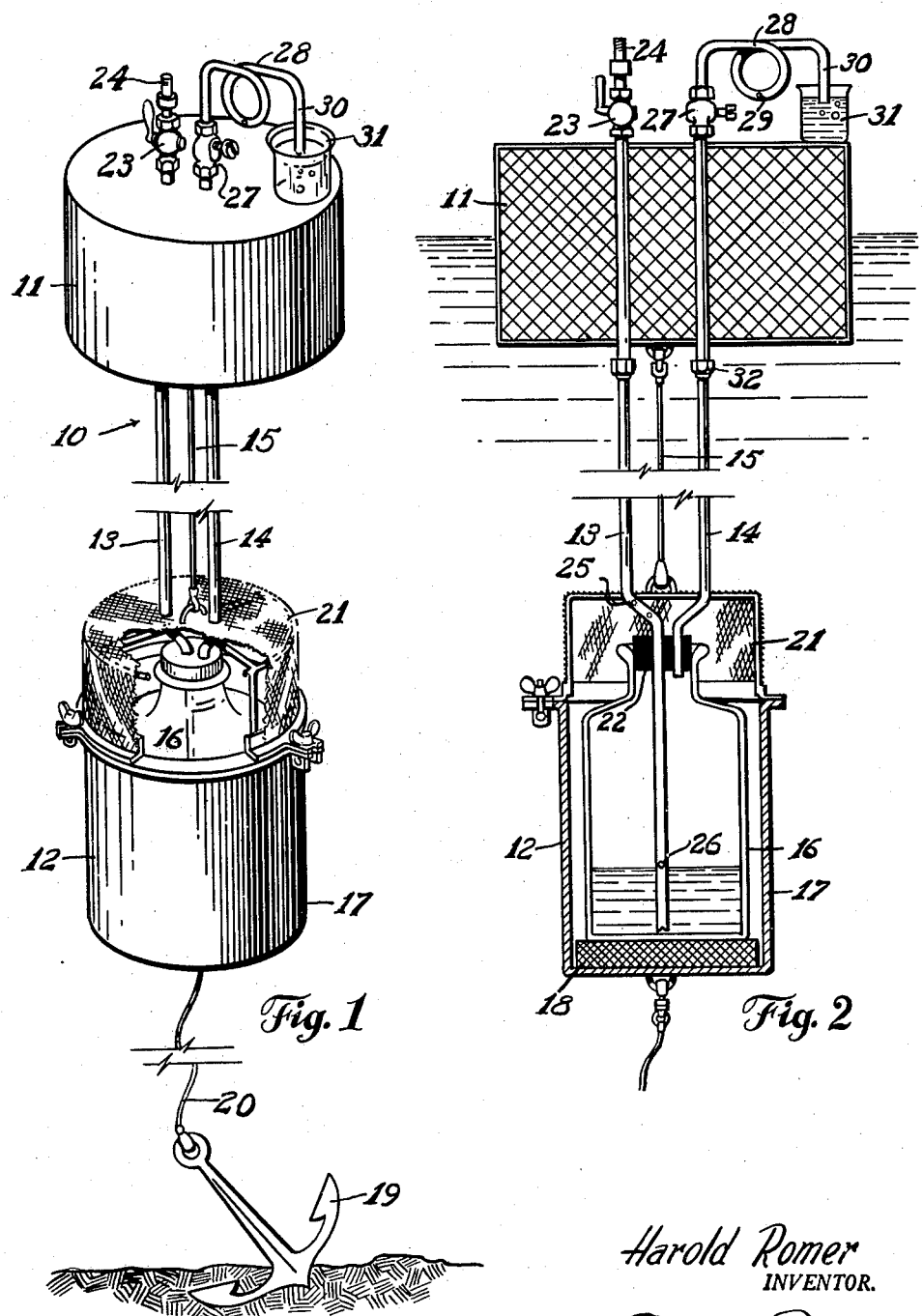

2,841,012

FLUID SAMPLERS

Harold Romer, Brooklyn, N. Y.

Application February 20, 1956, Serial No. 566,679

10 Claims. (Cl. 73—421)

This invention relates to liquid samplers and more particularly to a device capable of continuous sampling of liquid or fluid over varied and predetermined periods of time.

At present, the nearest type of sample to one produced by the device herein described is a composite sample. A composite liquid sample can be defined as one obtained by combining uniform quantities of liquid or fluid from the body to be sampled, the quantities to be obtained at regularly spaced time intervals. For example, assume that it is desired to obtain a composite sample of the water in a tidal basin during a period of time, taking into consideration the tides, sewage flow, shipping in the vicinity and other variable factors which alter the characteristics of the tidal basin water from hour to hour and possibly from minute to minute. It is necessary to have a considerable force of men and equipment to obtain the desired sample. These men will have to make rounds of the basin and take uniformly sized samples at the same locations at regular intervals throughout a complete time cycle. These individual samples can then be combined to form the composite sample.

It can readily be understood from the foregoing example that obtaining a composite sample is almost always an onerous and expensive task and one inherently tending to produce inaccurate results. The inaccurate results stem from human frailties and because of the necessary time intervals between obtaining the several individual samples.

However, a more accurate and less expensive composite sample can be obtained by using a sampling device which is designed to function continuously and automatically for the entire duration of the cycle and to gradually amass the desired sample. Several of these samplers disbursed throughout the basin would produce an inexpensive and nearly perfect sample.

A sample such as is here below described and claimed, functions with a minimum of labor requiring only positioning at the desired site, calibrating and at the end of the cycle removing the completed sample.

Therefore, it is an object of this invention to design a composite sampling device for liquids and fluids.

Another object is to design a liquid and fluid sampling device which will amass continuously the liquid or fluid until a desired sample is obtained.

A further object is to form the sampling device in such a matter that the rate of inflow of the liquid into the sampler can be controlled to provide a time-volume of sample relationship.

Another object is to describe a liquid sampling device suitable for containing and releasing a gaseous element while accumulating the liquid samples; the rate of acquisition of the sample being dependent upon the rate of the escape of the gas.

A further object is to have the sampling device comprised of a tank, valves and vents which together can contain a gaseous element and a fluid sample and regulate the rate of emission of the gas and the consequent amassing of sample.

Another object is to form the sampling device with a calibrating means and a gaseous release valve so that the rate of escape of the gas can be measured and regulated at the site of the sampling and the rate of acquisition of the sampling correspondingly controlled.

A further object is to provide means for regulating the depth at which the sample is to be obtained and also means for correspondingly regulating the gaseous pressure in the container whereby the rate of escape of the gas and the corresponding acquisition of the sample is controllable.

Another object is to form a liquid sampling device which will continuously sample at a desired rate of acquisition, at a desired depth and for a definite time interval.

These and other objects are accompanied by forming the liquid or fluid sampler with a bottle or container, hoses and valves and so assembling a device that at the start and throughout the sampling period the bottle contains gas or air under pressure and gradually loses the air at a desired rate through a needle valve, thus permitting liquid from the body being sampled to enter the bottle through an intake hole.

For further comprehension of the invention and of the objects and advantages thereof, reference will be had to the following description, the accompanying drawings and to the appended claims in which the various novel features of the invention are more particularly set forth.

In the accompanying drawings forming a material part of this disclosure:

Fig. 1 is a perspective view of a liquid and fluid sampler embodying the invention.

Fig. 2 is a vertical section through the center of Figure 1.

In the drawing and in the specification in which like numerals indicate similar elements, a composite and continuous sampling device 10 comprised of a float 11, submersible part 12 and hoses or tubes 13 and 14 for compressing and exhausting purposes respectively.

The float 11 can be formed of cork, balsa wood or any other suitable material which has a low enough density to keep the device floating. The submersible part 12 is suspended from the float at any desired length by a chain or cord 15 of sufficient length. To suspend the submersed part at different desired depths, a plurality of cords of different lengths can be provided.

The submersible part 12 is comprised of a bottle 16, for obtaining the sample, a holder 17 for the bottle, a weight 18, anchor 19 and anchor chain 20. The cord, securing the float and submersible part together, the weight, anchor and anchor chain all function together to stabilize and hold the submersible part in quiescent position at a desired depth. The bottle holder is provided with a removable mesh screen cap or top 21 to prevent undesirable solids from entering the bottle and the bottle is capped by a two hole stopper 22.

The hose or tube 13, for compressive purposes, extends from above the float to the vicinity of the bottom of the bottle, the float being provided with a passageway therethrough and one of the holes of the two holed stopper being used to admit the hose 13 to the bottle. The hose 13 is provided near its upper end with a shut off valve 23 and at the same end with a threading 24 suitable to receive a bicycle pump connection. The portion of the hose which normally rests within the screen cap but outside the bottle, is provided with two liquid or fluid intake holes 25 and the portion of the hose which normally rests within the bottle is provided with a pressure balance hole 26.

The hose or tube 14, for exhaustive purposes, extends from above the float to within the bottle, ending slightly below the stopper, the float being provided with a passageway therethrough and one of the holes of the two holed stopper being used to admit the hose 14 to the bottle. The upper end of hose 14, above the float is provided with outlet or exhaust valve 27, a splash loop 28, with a weep hole 29 at the lowest point of the loop and the tubing terminates in a downwardly extending arm 30.

The device is operated as follows:

A known quantity of a sterile liquid is inserted in the bottle and the bottle is stoppered and the device is assembled. The exhaust valve is closed, the shut off valve opened and a bicycle pump (not shown) is secured to the threaded part 24 and caused to produce gas or air under pressure in the bottle.

The bicycle pump and air medium for producing pressure in the bottle can be varied and any other suitable means of producing pressure such as a pressure capsule of carbon dioxide, compressed air or other gas could be attached to the threading 24. The air pressure, etc. is applied continuously to the system as the device is being lowered to the desired depth in the liquid or fluid. When the proper depth is reached, the shut off valve 23 is closed and pumping of air is stopped.

The pressure of the air or gas in the bottle 16, is maintained greater than the pressure of the liquid head at the opening 25, to prevent entry of the liquid into the container prior to the opening of the exhaust or needle valve. This status can be observed by the discharge and rise of excess air or gas bubbles from the hole 25. When the submersible part 12 reaches the desired depth, the pumping of air or gas is stopped, the pressure in the bottle automatically decreases to equal that of the hydrostatic head, and a balance of pressures is attained.

A glass or beaker 31 filled with water or other liquid is then placed over the tubing end 30 and the exhaust valve is opened. As the sample gradually enters the intake holes 25 of the pressure hose, the gas in the bottle is gradually expelled up the exhaust hose through its valve and into the water of the glass 31. The rate of the occurrence of the air bubbles flowing from the hose end 30 varies directly with the inflow of the sample into the bottle and the depth, and so the exhaust valve can be calibrated and adjusted to cause the bottle to be filled in any desired length of time, thus permitting the sample to be acquired over a considerable period of time if desired. Upon obtaining the desired sample, which may either be a full bottle or a sampling for a definite period of time, the bottle is removed. It should be noted that during the calibrating or setting of the needle valve, the weep hole is closed by the finger tip or other suitable means.

The quantity of sterile liquid, which seals off the lower end of the pressure hose, is introduced at the beginning of the sampling to prevent any inadvertent exhausting of gas from the bottle 12 through the holes 25 before and during the commencement of sampling. The pressure balance hole 26 is positioned just above the level of the sterile liquid. It causes a balancing of the pressure in the compression hose and the bottle and prevents the gaseous pressure in the bottle from forcing the sterile liquid up into the pressure hose and out through the intake holes 25 during the interval when the pump is stopped and the needle valve is yet unopened.

In order to adjust the submersible part to the proper depth, the hoses can be made sectionally as shown at 32 and several different lengths can be supplied and used interchangeably.

It should also be understood that while I have illustrated and described the preferred embodiment of my invention, I do not limit myself to the precise construction herein disclosed and the right is reserved to all changes and modifications coming within the scope of the invention as defined in any of the appended claims.

Having thus described my invention, what I claim as new and desire to secure by United States Letters Patent is:

1. A continuous liquid sampling device comprised of a bottle, a stopper therefor and hoses, one of the said hoses having a shut off valve at one end and having its other end extending into the bottle, a wall of said hose having a hole therethrough intermediate its ends for liquid intake purposes, the other hose also having an end extending into the bottle and its other end being provided with an exhaust valve and both said hoses being of such an extended length as to be able to reach the surface of the body of water being sampled whereby when the bottle is filled with a gaseous element under pressure and the exhaust valve opened the desired sample can flow into the bottle.

2. A continuous liquid sampling device comprised of a container, a hose, a float and valve means, said container suspended from the float and having an opening suitable for liquid intake, said valve means being connected by said hose to the container and being suitable for gradually permitting the exit of whatever gaseous contents may have been in the container, and said hose being of such an extended length as to permit a valve means to be positioned above the float whereby one sample can enter the container and expel its gaseous contents.

3. A liquid sampling device comprised of a float, container and two hoses, said container suspended from the float, one of said hoses extending from the float to within the container and having a shut off valve and means for securing said hose to a gaseous pressure producing means positioned adjacent the upper position of the float and a fluid intake opening adjacent to but outside the container, said other hose extending from the float to within the container and having an adjustable exhaust valve adjacent to the float whereby when gaseous pressure is established in the container, the shut off valve closed and the exhaust valve opened, a fluid sample can enter the container through the intake opening and the displaced gas exit through the exhaust valve.

4. A fluid sampling device as described in claim 3 and in addition, having its first mentioned hose extending adjacent to the bottom of the container.

5. A fluid sampling device as described in claim 3 and in addition having its first mentioned hose extending adjacent to the bottom of the container and having a pressure balance hole in the vicinity of but not at the bottom of the container.

6. A liquid sampling device comprised of a float, container, two hoses and stabilizing means, said container suspended from the float, one of said hoses extending from the float to within the container and having a shut off valve and means for securing said hose to a gaseous pressure producing means adjacent to the float and a fluid intake opening adjacent to but outside the container, said other hose extending from the float to within the container and having an adjustable exhaust valve adjacent to the float and said stabilizing means retaining the container suspended upright at a depth below the float whereby when gaseous pressure is established in the container the shut off valve closed and the exhaust valve opened, a fluid sample can enter the container through the intake opening and the displaced gas exit through the exhaust valve.

7. A fluid sampling device as described in claim 6 and in addition having a screening over the intake opening.

8. A fluid sampling device comprised of a container, tubes, a float, an anchor, an exhaust regulating valve, a shut off valve and a retaining means, said container being secured to the float by the retaining means and connected to and held at a desired depth in an upright position by said anchor, one of said tubes extending from above and adjacent to the float to within the container adjacent to its upper portion and said tube being connected at its upper end to the exhaust regulation valve, and a second tube extending from above and adjacent to the float to within the container adjacent its lower portion, said tube being secured at its upper end to the shut off valve and having an opening intermediate its ends and exterior of the container, whereby when more gaseous pressure is maintained in the container than the hydrostatic pressure existing at the depth of the container no sample is acquired in the container, and when the exhaust valve is opened to permit a gaseous exhaust at the desired rate, fluid sample is acquired at the same rate.

9. A fluid sampling device as described in claim 8 and having in addition an opening in said second tube intermediate its section within the container whereby pressure is equalized within the container to prevent any fluid within the container being forced out of the opening in said second tube before the exhaust valve is opened.

10. A fluid sampling device as described in claim 8 and having in addition an upward extending means secured to said second tube at its end within the container whereby pressure is equalized within the container to prevent any liquid within the container from being forced out of the opening in said second tube intermediate its ends before the exhust valve is opened.

References Cited in the file of this patent

UNITED STATES PATENTS

| | | |
|---|---|---|
| 1,433,075 | Gottlieb | Oct. 24, 1922 |
| 2,250,722 | Nichols | July 29, 1941 |
| 2,294,655 | Einstein | Sept. 1, 1942 |
| 2,300,194 | Anderson | Oct. 27, 1942 |